UNITED STATES PATENT OFFICE.

JAMES BROWN, OF ALDGATE, ENGLAND.

IMPROVEMENT IN THE MANUFACTURE OF PAPER AND PAPER-PULP.

Specification forming part of Letters Patent No. 23,897, dated May 10, 1859.

*To all whom it may concern:*

Be it known that I, JAMES BROWN, of Aldgate, in the city of London, in that part of the United Kingdom of Great Britain and Ireland called England, chemist, have invented a new and useful Improvement in the Manufacture of Paper; and I do hereby declare that the following is a full and exact description thereof.

The nature of my invention consists in incorporating or combining glycerine with pulp from which paper is to be made, or with paper at any stage of its manufacture, or in coating paper after its manufacture with glycerine.

In carrying the invention into effect, the method of applying or using the glycerine and the quantity of it used may be varied according to the degree of softness and pliability which the paper is intended to possess.

In manufacturing paper according to this invention it is in most cases necessary to employ size of some description, in order to insure proper dryness in the finished paper, otherwise the glycerine absorbs moisture and keeps the paper damp; but for papers which are used in a damp state, such as the papers for taking press-copies from letters and other documents, little or no size will be required in their manufacture.

The glycerine may be mixed with the pulp, which is to be made into paper. To a quantity of pulp and size sufficient to produce one hundred pounds of paper when dry is added about five pounds of glycerine of a specific gravity of one and sixteen one hundredths, and well mixed in the pulping-engine or otherwise. These proportions I have found to answer well, but they may be varied. In some cases it may be convenient to mix the glycerine with the size and use the two together in a manner similar to that in which size is applied in the process known as "tub" or "trough" sizing. For this purpose the glycerine may be mixed with the size in the proportion of about one part, by weight, of glycerine to seven parts, by weight, of size in solution. In other cases it may be convenient to apply the glycerine to the surface of the paper in what is called its "finished" state by first dissolving glycerine in water in the proportions of about one part, by weight, of glycerine of the aforesaid specific gravity to seven parts, by weight, of water, and then spreading the solution over the surface of the paper or dipping the paper into the solution. For paper to be used in a damp state the size may be entirely dispensed with, or its proportion may be much diminished. In all cases the softness and absorbency of the paper may be increased or diminished by increasing or diminishing the quantity of glycerine used. In other respects the ordinary modes of manufacturing paper may be adopted, the glycerine being applied to the paper or mixed with the material of which it is made in any convenient manner, as before mentioned.

The glycerine, as when used for ordinary paper, need not always be pure, but may be used in the state in which it appears in soap lyes after a portion of the salt has been extracted.

The advantages of my invention consist in improving the general appearance of the paper, in giving to it pliability and silkiness of feeling, and in impressing it when dry from type, plates, blocks, stone, &c., with ordinary printing-ink as efficiently as ordinary paper is printed when damp.

What I claim as my invention, and desire to secure by Letters Patent, is—

The treatment of paper and paper material with glycerine, substantially as described, to be employed for printing or other purposes.

JAS. BROWN.

Witnesses:
   JOHN T. PITMAN,
   T. P. CAPP.